UNITED STATES PATENT OFFICE 2,352,586

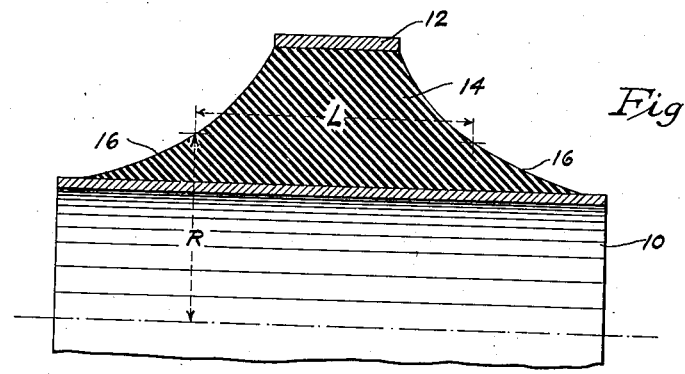
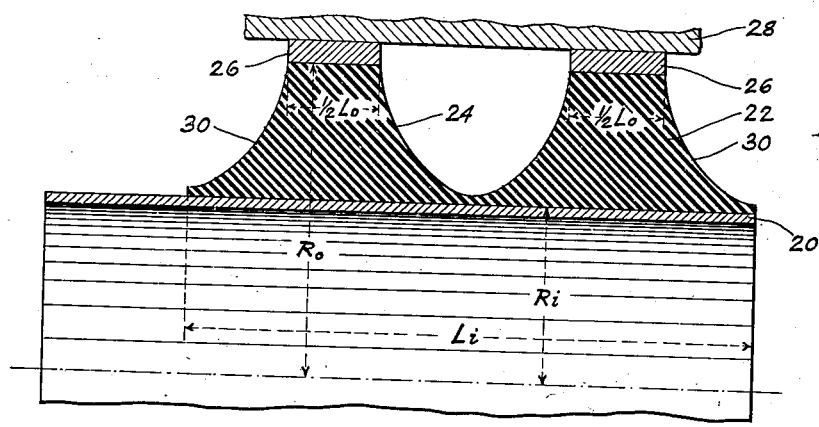
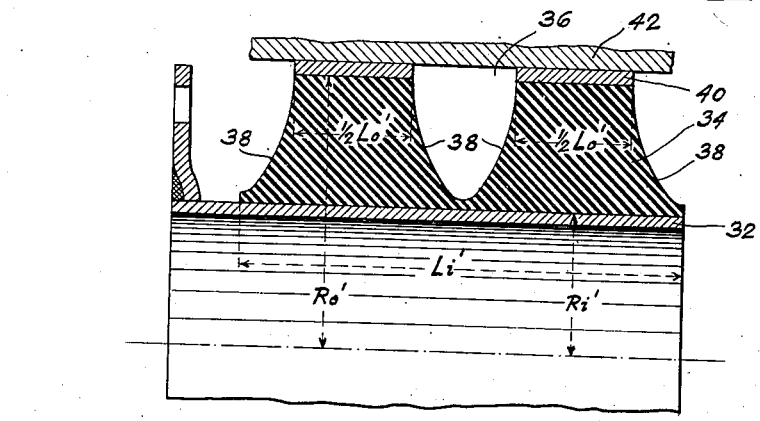

TORSION UNIT

Karl B. Kilborn and Samuel D. Gehman, Akron, Ohio, assignors to Wingfoot Corporation, Akron, Ohio, a corporation of Delaware Application December 16, 1942, Serial No. 469,164

6 Claims. (Cl. 267—21)

This invention relates to torsion units, and, more particularly, is concerned with units of this character including a body of resilient material, such as rubber, positioned between inner and outer members which are generally made of metal and to which the resilient body is secured.

Heretofore, torsion units have been made by concentrically positioning cylindrical sleeves of metal of different diameters and securing a rubber body therebetween. The inner metal sleeve is generally secured to one of the elements, such as an axle, which is to be resiliently carried for torsional movement, and the outer metal sleeve is secured to the other element, such as a housing, and with respect to which the axle has relative torsional movement. Also, it has been proposed to shape the rubber body connecting the inner and outer members so that each portion of the rubber body is subjected to substantially the same stress in operation. In other words, it is now known that the torsional resistance in any cylindrical element of the rubber body of the torsion unit just described is equal to the circumferential area of the element multiplied by unit stress and multiplied by its moment arm, which, expressed in equation form, becomes $2\pi RLSR = 2\pi R^2 LS$, in which R is the radius of any given cylindrical element, L is the length of the cylindrical element in the rubber body, and S is the torsional stress in each unit area of the cylindrical element. With stress a constant, the equation resolves itself down to $K = R^2 L$.

However, when this formula is used in the design of a torsion unit having a rubber body of a radial thickness approaching the radius of the inside member, a rubber body is provided which is relatively thin in an axial direction adjacent the outer member and relatively long in an axial direction adjacent the inner member with a gradual curve forming the outer surface or ends of the rubber body between the inner and outer members. While the theoretical considerations are correct, we have found that the radial thickness of the rubber adjacent the inner member is apt to be so small that actually the radially thin rubber does not carry its proper share of a torsion load. Moreover, we have found that a torsion unit constructed in strict accord with the theory is so much longer adjacent the inner metal member than it is adjacent the outer member that the unit is awkward to handle and mount in operative position. Further, in a bushing unit having inner and outer members and rubber of substantially the same length, as for example used in compression supports, if this bushing is adapted to torsion operations, then much of the rubber is unnecessary.

It is the general object of our invention to avoid and overcome the foregoing and other difficulties of, and objections to, rubber torsion units, and torsion units constructed strictly in accord with theoretical considerations, by the provision of an improved practical torsion unit incorporating a resilient body material and wherein substantially every portion or cylindrical element of the rubber body is substantially uniformly stressed in actual operation, and with the resulting unit having dimensions in inner and outer portions thereof sufficiently similar to avoid awkwardness in mounting and handling.

Another object of our invention is the provision of a torsion unit including a body of resilient material, such as rubber, and wherein the actual contacting area between the resilient body and the inner member of the unit is substantially equal to the contacting area between the outer member and the resilient body, and is substantially equal to the area of any cylindrical element of the resilient body.

Another object of our invention is to provide a torsion spring of the character described, having increased efficiency, substantially uniform torsional resistance throughout, substantially uniform stress per unit area, and substantially maximum softness and resilient action for a given volume of resilient material operated within its permissible shearing stress.

Another object of our invention is to provide an improved torsion unit having a resilient body at least partially divided into a plurality of coacting substantially parallel and usually circumferentially-extending sections.

The foregoing and other objects of our invention are achieved by the provision of a rubber torsion spring including an inner member, a body of rubber material secured to the inner member and having at least one groove therein at least partially dividing the rubber material body into separate sections, and means secured to the outer surface of the rubber material body. The area of any cylindrical element of the rubber material body at any radius may be made substantially equal to the area of every other cylindrical element thereof, or each of the separate sections of the body may vary in axial dimension substantially inversely with the square of the radial distance from the axis of the unit.

For a better understanding of our invention, reference should be had to the accompanying drawing, wherein Fig. 1 illustrates in fragmentary cross section a rubber torsion unit constructed substantially in accordance with proposed prior art practices; Fig. 2 shows in fragmentary section one embodiment of our improved torsion unit; and Fig. 3 similarly illustrates a second embodiment of the improved torsion unit of our invention.

We contemplate that the torsion unit of our invention may take a plurality of forms, for example, to adapt it to any given torsional operation. However, the unit is most conveniently made in the form of inner and outer members concentric to an axis and with the members comprising metal tubes of different diameters having a body of resilient material secured therebetween, and, therefore, we have so illustrated and will so describe the invention. We might note that the terms "resilient material," "rubber," and "elastic," as employed in this specification and in the claims, are intended to include any one of a variety of materials, and, specifically, natural rubber in any of its compounded forms, artificial or synthetic rubber in any of its various forms, and any similar materials.

Turning to Fig. 1 of the drawing, a prior art type of torsion unit has been therein illustrated as including an inner metal tube 10, or axle member, an outer metal ring or tube 12, and an interposed body or sleeve of resilient material 14 which is secured to the inner and outer metal tubes. The ends of the rubber body 14, as defined by the lines 16, are so positioned that each and every portion of the resilient body 14 is subjected to substantially equal stress, all as noted above. In other words, $R^2L=K$, and the length of each portion of the rubber or resilient body varies substantially inversely with the square of its radial distance from the axis of the unit. But it will be seen, from an examination of Fig. 1, that the radial thickness of the resilient body 14 adjacent the ends of the tube 10 is quite short, so that from a practical standpoint the radially thin rubber does not properly carry its share of the load in torsion movement between the inner tube 10 and outer tube 12. Further, it will be recognized that the unit shown in Fig. 1 is awkward and inconvenient to mount inasmuch as the axial length of the inner tube 10 is much greater than the axial length of the outer tube 12. Again, if the inner and outer members are made of the same length and the space therebetween is filled with rubber, as has been done, for example, in a spring shackle bushing, much of the rubber is loafing and the stress is not uniform.

To avoid and overcome the difficulties mentioned above, we provide the improved torsion unit illustrated in one embodiment in Fig. 2. In this figure of the drawing, the numeral 20 indicates an inner member, generally of substantially tubular form, and of a metal such as steel, which is preferably brass-plated so that a body 22 of resilient material, for example, rubber, can be vulcanized thereto. The rubber body 22, which is substantially cylindrical in the form of the invention illustrated, is formed with at least one circumferentially-extending groove 24 which at least partially divides the resilient body 22 into a plurality of sections or parts which are positioned in substantially parallel relation, and which extend substantially circumferentially. Secured to the outer peripheral surface of the resilient body 22 is one or more outer members 26 which are conveniently made, in the embodiment of the invention illustrated, in the form of steel rings which are suitably brass-plated so that the resilient body 22 may be secured, as by vulcanization, thereto. The outer members 26 are conveniently made separate and co-extensive with the outer peripheries of the sections of the resilient body 22, and are adapted to be clamped or otherwise secured in a housing 28 or other member so that the members 26 are carried thereby and are, in effect, secured together.

The form of our invention shown in Fig. 2 is made so that substantially every portion of the resilient body 22 is subjected to equal stress in actual use. In other words, the $R^2L$ of any cylindrical element or section of the body is substantially equal to $K$, which is, of course, a constant selected with knowledge of the torsional shear characteristics of the rubber and the load to which the torsion unit is to be subjected in use. For example, $(R_o)^2$ times $\frac{1}{2} L_o$ plus $\frac{1}{2} L_o = K = (R_i)^2$ times $L_i$. Actually, we have found that it is often convenient to make $(R_i)^2$ times $L_i$ somewhat less than equal to $K$, and, specifically, up to about twenty-five percent less, with the value of $K$ increasing outwardly of the unit. In Fig. 2 it will be seen that the bottom of the groove 24 and the radially innermost portions of the sides 30 of the resilient body 22 are terminated somewhat short of the theoretical. In other words, if $R_o$ equals in a given structure $3\frac{1}{2}$ inches and $\frac{1}{2} L_o$ equals one inch, then $(R_o)^2$ times $\frac{1}{2} L_o$ plus $\frac{1}{2} L_o = K = 24.5$. Then with $R_i$ in the same structure, being equal to 1.8125 inches and substituting in the formula $(R)^2L = K = 24.5$ and solving for $L$, we have $L_i = 7\frac{1}{2}$ inches. Actually, $L_i$ is conveniently made about six inches so that using $L_i$ as six inches and $R_i$ as 1.8125 inches and substituting in the formula, we have a $K$ of 20 rather than a $K$ of 24.5.

Summarizing, the embodiment of our invention illustrated in Fig. 2 of the drawing breaks the long flat curves at the ends of the theoretically correct resilient body, as indicated at 16 in Fig. 1, down into a plurality of of shorter and sharper curves at the ends of the sections of the resilient body 22, as indicated by the surfaces 30 and the surface of the groove 24 in Fig. 2, but with the axial length of any portion of the resilient body being substantially inversely proportional to the square of the radius, and as a specific embodiment, with the $R^2L$ of the radially inner part of the resilient body being up to about twenty-five percent less than the $R^2L$ of the radially outer portions of the body and with the value of $K$ increasing outwardly of the body.

The embodiment of our invention illustrated in Fig. 3 of the drawing takes a somewhat different form than that already described. Specifically, instead of holding $R^2L$ of each portion of the resilient body substantially equal to the same constant, we provide substantially equal cylindrical elements or areas at every radial portion in the resilient body. In other words, and having particular reference to Fig. 3 of the drawing, the numeral 32 indicates generally an inner, or axle member, usually in the form of a brass-coated steel tube, to which is secured, as by vulcanization, a resilient body or sleeve 34, of rubber or the like. The resilient body 34 is at least partially divided by at least one groove 36 into a plurality of sections having sides 38 which are in the form of curves so that each cylindrical element or area of the sections is substantially equal to every other radially spaced cylindrical element or area of the sections. Outer members 40, usually in the form of steel rings suitably brass-plated for vulcanization to the resilient body 34, complete the combination, with the rings 40 being secured in a suitable housing 42 or similar member so that the outer members 40 are, in effect, secured together. Now, the area of the resilient body 34 in engagement with the inner member 32 is equal to $2\pi R_i^1$ times $L_i$. Similarly, the outer peripheral area of the resilient body 34 is equal to $2\pi R_o^1$ times $\frac{1}{2} L_0^1$ plus $\frac{1}{2} L_0^1$. In this form of our invention, as stated just above, $2\pi R_i^1$ times $L_i^1$ is substantially equal to $2\pi R_o^1$ times $\frac{1}{2} L_0^1$ plus $\frac{1}{2} L_0^1$, and in the same way, any other radially spaced cylindrical element or area of the resilient body 34 is substantially equal thereto. Variations of up to about fifteen percent in area are not objectionable in this embodiment of our invention.

We have found that the embodiment of the invention illustrated in Fig. 3 is often a practical structure embodying the characteristics of substantially uniform stress in each portion of the resilient body during operation. However, we preferably, although not necessarily, embody our invention in the form illustrated in Fig. 2 of the drawing, which permits a closer approach to the theoretical while incorporating therein the practical considerations which we have hereinabove described.

From the foregoing it will be recognized that the objects of our invention have been achieved by the provision of an improved torsion unit of the character described and wherein theoretical and practical considerations are merged into a particularly advantageous and satisfactory torsion unit having uniform stress characteristics and convenience in mounting, shape and structure. We are able to obtain a maximum of torsion characteristics in a unit of minimum weight and size, and our invention is readily practiced and adapts itself to commercial production, methods, and apparatus.

While, in accordance with the patent statutes, we have particularly illustrated and described our invention, it should be particularly understood that we are not to be limited thereto or thereby, but that the scope of the invention is defined in the appended claims.

We claim:

1. A torsion spring, comprising an axle member, a sleeve of resilient material secured at its inner surface to said axle member, said sleeve being circumferentially subdivided into a number of sections, each section varying in axial dimension substantially inversely with the square of its radial distance from the axis of the axle, the outer circumferential surface of all said sections being attached to one common member capable of rotary movement with respect to said axle member.

2. A torsion spring, comprising an axle member, a sleeve of resilient material secured at its inner surface to said axle member, said sleeve being circumferentially subdivided into a number of sections, each section decreasing in axial dimension as the radial distance from the axis of the axle increases, each section having a separate relatively unyielding sleeve secured to its outer surface, said last-named sleeves being secured to one common member capable of rotary movement with respect to said axle member.

3. A torsion spring, comprising an axle member, a sleeve of resilient material having its inner surface secured to said axle member, said sleeve being circumferentially subdivided into a number of sections, each section decreasing in axial dimension as the radial distance from the axis of the axle increases, each section having a separate relatively unyielding sleeve secured to its outer surface, said separate sleeves being surrounded and rigidly connected to one common rigid member.

4. A torsion spring, comprising an inner member, a sleeve of rubber material secured by its inner surface to the inner member, said sleeve being divided circumferentially into a plurality of sections, each section decreasing in axial dimension as the radial distance from the inner member increases, a separate outer member secured to the outer surface of each rubber material section, the total area of engagement of the outer members to the rubber material being substantially equal to the total area of engagement of the inner member with the rubber material.

5. A torsion spring, including an inner member, an outer member, an interposed body of rubber secured to and between the members, said body being separated into a plurality of sections, each section varying in axial dimension substantially inversely as the square of the radial distance from the axis of the unit, but with the square of the radial distance times the axial length of the innermost portions of the sections being less than the square of the radial distance times the axial length of the outermost portions of the sections.

6. A torsion spring, including an inner member, an outer member, an interposed body of rubber secured to and between the members, said body being separated into a plurality of sections, each section decreasing in axial dimension as the radial distance from the axis of the unit increases, and with the square of the radial distance times the axial length of the innermost portions of the sections being up to twenty-five percent less than the square of the radial distance times the axial length of the outermost portions of the sections.

KARL B. KILBORN.
SAMUEL D. GEHMAN.